United States Patent [19]
Lebedev et al.

[11] Patent Number: 4,490,599
[45] Date of Patent: Dec. 25, 1984

[54] APPARATUS FOR FLASH WELDING OF PIPES

[75] Inventors: Vladimir K. Lebedev; Sergei I. Kuchuk-Yatsenko; Vasily A. Sakharnov; Boris A. Galian, all of Kiev, U.S.S.R.

[73] Assignee: Institut Elektrovarki Imeni E.O. Patona, Kiev, U.S.S.R.

[21] Appl. No.: 295,568

[22] Filed: Aug. 24, 1981

[51] Int. Cl.³ .................. B23K 11/04; B23K 11/32
[52] U.S. Cl. .................... 219/61.1; 219/66; 219/97; 219/116
[58] Field of Search ............... 219/97, 59.1, 61.1, 219/63, 66, 116

[56] References Cited

U.S. PATENT DOCUMENTS

| 2,993,109 | 7/1961 | Tudbury | 219/63 |
| 4,273,985 | 6/1981 | Paton et al. | 219/97 |
| 4,310,737 | 1/1982 | Paton et al. | 219/61.1 |

Primary Examiner—Roy N. Envall, Jr.
Assistant Examiner—Alfred S. Keve
Attorney, Agent, or Firm—Lilling & Greenspan

[57] ABSTRACT

An internal apparatus for flash welding pipes together in end to end relationship both under factory conditions and in the field, for example in laying trunk pipelines, comprises an elongate supporting member carrying an axially movable clamping assembly with electrode jaws for clamping one pipe, an axially immovable clamping assembly with electrode jaws for clamping the other pipe, and a doughnut-type welding transformer. The welding transformer is disposed at the side of the axially immovable clamping assembly, which is distant from the joint. The axially immovable clamping assembly is mounted on the elongate supporting member in a manner to provide an annular clearance therebetween such that there are extending therethrough two coaxial contact tubes, which are electrically insulated from one another and connect the welding transformer with the electrode jaws, whereby in operation a welding circuit is established.

1 Claim, 2 Drawing Figures

U.S. Patent
Dec. 25, 1984
4,490,599
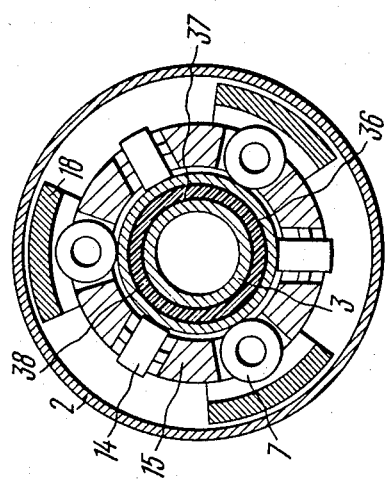
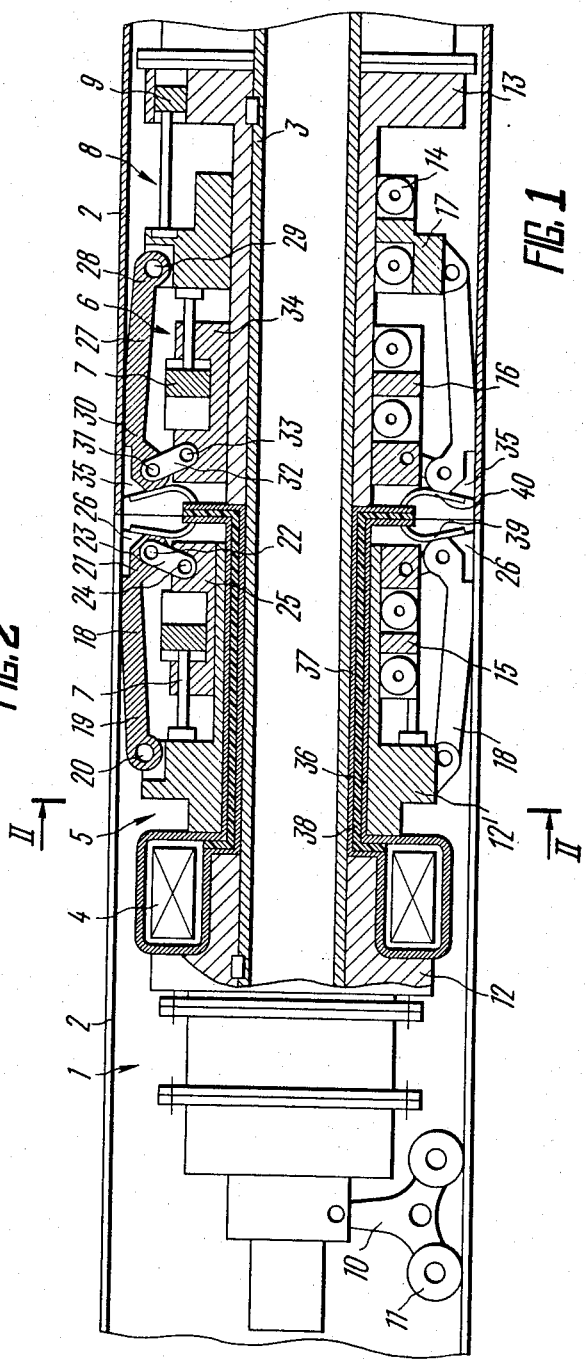

APPARATUS FOR FLASH WELDING OF PIPES

BACKGROUND OF THE INVENTION

1. Field of the Invention

The present invention relates to an apparatus for flash welding pipes, which may be used under field conditions, for example in laying trunk pipelines, and under factory conditions, that is for welding pipes of relatively large diameters.

The existing apparatus for flash welding pipes can be classified into one of the three following categories:

(1) external welders, wherein all the mechanism, including the welding transformer, is arranged outside the pipes to be welded;

(2) internal welders, wherein all the mechanism, including the welding transformer, is arranged inside the pipes to be welded;

(3) combination welders, wherein centering and upsetting mechanisms are accommodated inside the pipes to be welded, whereas the welding transformer and current-contact mechanisms are outside the pipe.

External welders are recommended for welded pipes of relatively small diameters: one would need a heavy and cumbersome external welder to weld large-diameter pipes. In the case of external welders, it is very difficult to inspect the joint.

Internal welders are recommended for welding large diameter pipes both in the field and under factory conditions when the welder is moved from one joint to another as is the case of laying a trunk pipeline. The size of an internal welder is restricted by the pipe diameter, and thus first-class design and manufacture are imperative, especially with regard to the welding transformer and current-contact elements.

Combination welders are normally recommended for welding medium-diameter pipes (820 to 1020 mm) under factory conditions. The mechanism of such welders is found both inside and outside the pipe, wherefore the mechanism and the joint are not easily accessible. The large size is another disadvantage of combination welders.

Therefore, internal welders are best suited for flash welding of large-diameter pipes.

2. Description of the Prior Art

U.S. Pat. No. 3,164,712 teaches an apparatus for flash welding pipes, designed to operate inside the pipes and comprising an elongate supporting member carrying an axially movable and an axially immovable clamping assembly for clamping the pipes. These assemblies have electrode jaws connected through a current lead-in to a welding transformer.

The prior art apparatus comprises a doughnut-type welding transformer arranged on one of the cylinders in the axially immovable clamping assembly, that is clear of the joint. The electrode jaws and the transformer are connected by means of flexible buses. The electrode jaws are equidistantly arranged on a circumference and insulated from the structure of the apparatus.

In operation, the flashing action is initiated, but on some portions of the end face of the pipes being welded, i.e., on the portions which are in closest proximity to each other, inasmuch as the pipes are not ideal both along the circumference and over the end face. As the flashing proceeds the whole end face is brought in contact. As a consequence at the initial stage of the flashing action the transformer operates partially, that is only some of its windings are under load and those are the windings that are closest to the end face portions being flashed. Therefore the transformer power is consumed fractionally and the initial stage of flashing is too prolonged. The duration of the initial stage of flashing affects the duration of the whole welding process, which restricts the possible increase in the productive capacity of the prior art apparatus.

SUMMARY OF THE INVENTION

An object of the invention is to provide an apparatus for flash welding of pipes, designed to operate inside the pipes, and having a simplified current lead-in.

Another object of the invention is to provide an apparatus for flash welding pipes, designed to operate inside the pipes, which, due to a structurally simplified current lead-in, provides for a reduced initial stage of flashing.

Still another object of the invention is to provide an apparatus for flash welding pipes, designed to operate inside the pipes, which features improved production capacity.

Yet another object of the invention is to provide an apparatus for flash welding pipes, designed to operate inside the pipes, which is more reliable in operation.

These and other objects of the invention are attained by providing an annular clearance between the axially immovable clamping assembly and the elongate supporting member and the arrangement of a contact tube means in the clearance. The contact tube means comprises two coaxial contact tubes, which are electrically insulated from one another, each having one end thereof terminating at corresponding taps of the doughnut-type welding transformer and the other one electrically connected to corresponding electrode jaws of both the axially movable and the axially immovable clamping assemblies.

Such a contact tube means is simple in construction and hence it enhances the reliability of the apparatus for flash welding pipes. With such a contact tube means, the input power from the welding transformer is reduced and the time of the initial stage of flashing is shortened, which improves the productive capacity of the apparatus for flash welding pipes.

The electrical connection of each contact tube with the electrode jaws may be realized by means of a flexible cable to maintain the same electrical connection as the jaws move radially in clamping the pipes prior to welding and releasing them after welding.

BRIEF DESCRIPTION OF THE DRAWING

A better understanding of the present invention will be had from a consideration of the following detailed description of a preferred embodiment thereof, taken in conjunction with the accompanying drawing, wherein:

FIG. 1 is a view in longitudinal section of an apparatus for flash welding pipes, embodying the present inventive concept; and FIG. 2 is a sectional view taken along the line II—II of FIG. 1.

DESCRIPTION OF THE PREFERRED EMBODIMENT

Referring now to FIGS. 1 and 2 of the accompanying drawing, an apparatus 1 for flash welding pipes is accommodated inside the pipes 2 to be welded and comprises an elongate supporting member 3 whose longitudinal axis coincides with the axis of the pipes 2 to be welded. Mounted on the elongated supporting member 3 in a coaxial arrangement are a doughnut-type welding transformer 4 and two pipe clamping assemblies 5 and 6 each provided with a hydraulic drive 7 and wherein the assembly 5 is axially immovable whereas the assembly 6 is axially movable.

Also mounted on the elongate supporting member 3, coaxially therewith, is a pipe flashing and upsetting assembly 8 provided with a hydraulic drive 9 of its own and movably connected with the axially movable clamping assembly 6. The apparatus is movable along the inside of the pipes by a trolley 10 having wheels 11 driven by a suitable motor (not shown).

Rigidly mounted at the opposite ends of the elongate supporting member 3 are two bearing discs 12 and 13 between which mounted on roller supports 14 and spaced along the member 3 are three sleeve members 15, 16 and 17. The first and second sleeve members 15 and 16 are incorporated in the pipe clamping assemblies 5 and 6 respectively, whereas the third sleeve member 17 is incorporated in the pipe flashing and upsetting assembly 8.

The axially immovable clamping assembly 5 and the elongate supporting member 3 are arranged in a manner to define an annular clearance therebetween, which is clearly seen in the drawing wherein the sleeve member 15 is shown as having no direct contact with the supporting member 3.

As can be seen in FIG. 1 the bearing disc 12 is arranged behind both the welding transfomer 4 and the sleeve member 15 as viewed from the joint side, that is the welding transformer 4 is mounted adjacent the side of the axially immovable clamping assembly 5, which is distant from the joint of the pipes 2. The sleeve member 17 of the pipe flashing and upsetting assembly 8 is arranged close to the bearing disc 13 and coupled thereto by means of its hydraulic drive 9. The sleeve member 16 of the axially movable clamping assembly 6 is interposed between the sleeve member 17 and the pipe joint and coupled to the sleeve member 17 by its hydraulic drive 7 for moving the same along the elongate supporting member 3.

The pipe clamping assembly 5 comprises clamping levers 18 equidistantly and symmetrically arranged in relation to the longitudinal axis of the supporting member 3. One end 19 of each lever 18 is pivoted as at 20 to the bearing disc 12' for a rotary movement thereof in the radial direction, whereas the other end 21 is pivoted as at 22 to the end of its respective expansion lever 23.

The opposite ends of the expansion levers 23 are pivoted as at 24 to the portion 25 of the sleeve member 15, which is nearest the pipe joint. The ends 21 of the clamping levers 18 carry electrode jaws 26 connected to corresponding taps of the transformer 4 via a current lead-in, as will be hereinafter described.

The axially movable clamping assembly 6 is of a similar design and differs from the pipe clamping assembly 5 only in that each clamping lever 27 has one end 28 thereof pivoted as at 29 to the sleeve member 17 of the flashing and upsetting assembly 8, whereas the opposite end 30 is pivoted as at 31 to the end of its respective expansion lever 32. The opposite ends of the expansion levers 32 are pivoted as at 33 to the portion 34 of the sleeve member 16, which is nearest the pipe joint. The ends 30 of the clamping levers 27 carry electrode jaws 35 connected to corresponding taps of the transformer 4 via a current lead-in corresponding to the description which will be hereinafter made.

The current lead-in connecting the corresponding taps of the welding transformer 4 with the electrode jaws 26 and 35 comprises two contact tubes 36 and 37 extending in the annular clearance defined by the axially immovable clamping assembly 5 and the elongate supporting member 3. The contact tubes 36 and 37 are mounted coaxially and insulated from one another by an insulation liner 38. The ends of the contact tubes at one side thereof are terminated at corresponding (different) taps of the welding transformer 4 and at the other side are electrically connected to the corresponding electrode jaws 26 and 35 through flexible cables such as at 39 and 40, whereby in operation a welding circuit is established.

In operation, the apparatus is driven into one of the pipes 2 to be welded so as to position the pipe end between the jaws 26 and 35. The hydraulic drive 7 of the axially immovable clamping assembly 5 is actuated and drives the sleeve member 15 on its roller support 14 along the supporting member 3 toward the joint. While the sleeve member 15 is driven along the supporting member the levers 23 cannot move together with the sleeve member 15 in translation but in rotation about 24 only. As the levers 23 rotate they change their position relative the supporting member 3 and expand the clamping levers 18 radially, whereby the levers 18 approach the inner side of the pipes 2 and a further movement of the sleeve member 15 in the same direction makes the jaws 26 abut the pipe to clamp the same pipe in position and align the apparatus with the pipe. Now the other pipe length is slipped over the free end of the apparatus until it abuts the end face of the former pipe. This pipe is clamped by means of the pipe clamping assembly 6 in a manner similar to clamping the other pipe. As soon as the other pipe is clamped the two pipes are aligned on their end faces and the axis of the apparatus is coincident with the axis of the pipes.

Next power is supplied to the welding transformer 4 and the pipe flashing and upsetting assembly 8 is actuated to drive the pipe clamping assembly 6 and the pipe clamped thereon in the direction of the other pipe. Now current from the secondary windings of the welding transformer 4 is applied to the joint and thus an electric circuit is established, which includes the contact tubes 36 and 37, the flexible cables 39 and 40 as well as the jaws 26 and 35. Since the end faces of the pipes usually have surface irregularities the portions in contact are fused until all the end face is fused to complete flashing and then upsetting by the assembly 8 follows.

While the flashing action proceeds the contact tubes act as a current summing-up means and a current distributor, that is, it applies current in due moment of the flashing action and to a due portion of the joint, thereby flashing is intensified and the initial stage of flashing is reduced accordingly.

What is claimed is:

1. An apparatus for flash welding of pipes, designed to operate inside the pipes and comprising:
    an elongated supporting member whose axis can coincide with the axis of the pipes to be welded, an axially movable clamping assembly for clamping one of the pipes to be welded, mounted on said elongated supporting member and carrying electrode jaws;
    a flashing and upsetting assembly operatively connected with said axially movable clamping assembly for aligning the pipes to be welded as flashing and upsetting actions proceed;

an axially immovable clamping assembly for clamping the other one of the pipes to be welded, mounted on said elongated supporting member in spaced circumferential relationship therewith and carrying electrode jaws;

a doughnut-type welding transformer mounted on said elongated supporting member adjacent the side of said axially immovable clamping assembly, which is distant from the electrode jaws thereof; and two coaxial contact tubes electrically insulated from one another and disposed between and coaxial with said axially immovable clamping assembly and said elongated supporting member, one end of each of said contact tubes terminating at corresponding taps, of said welding transformer, while the other one being electrically connected to corresponding electrode jaws of both said axially movable and said axially immovable clamping assemblies.

* * * * *